July 25, 1961 D. H. GIESKIENG 2,993,687
WET PROCESS FOR MAKING CEMENT AND APPARATUS FOR USE THEREWITH
Filed April 28, 1958 2 Sheets-Sheet 1
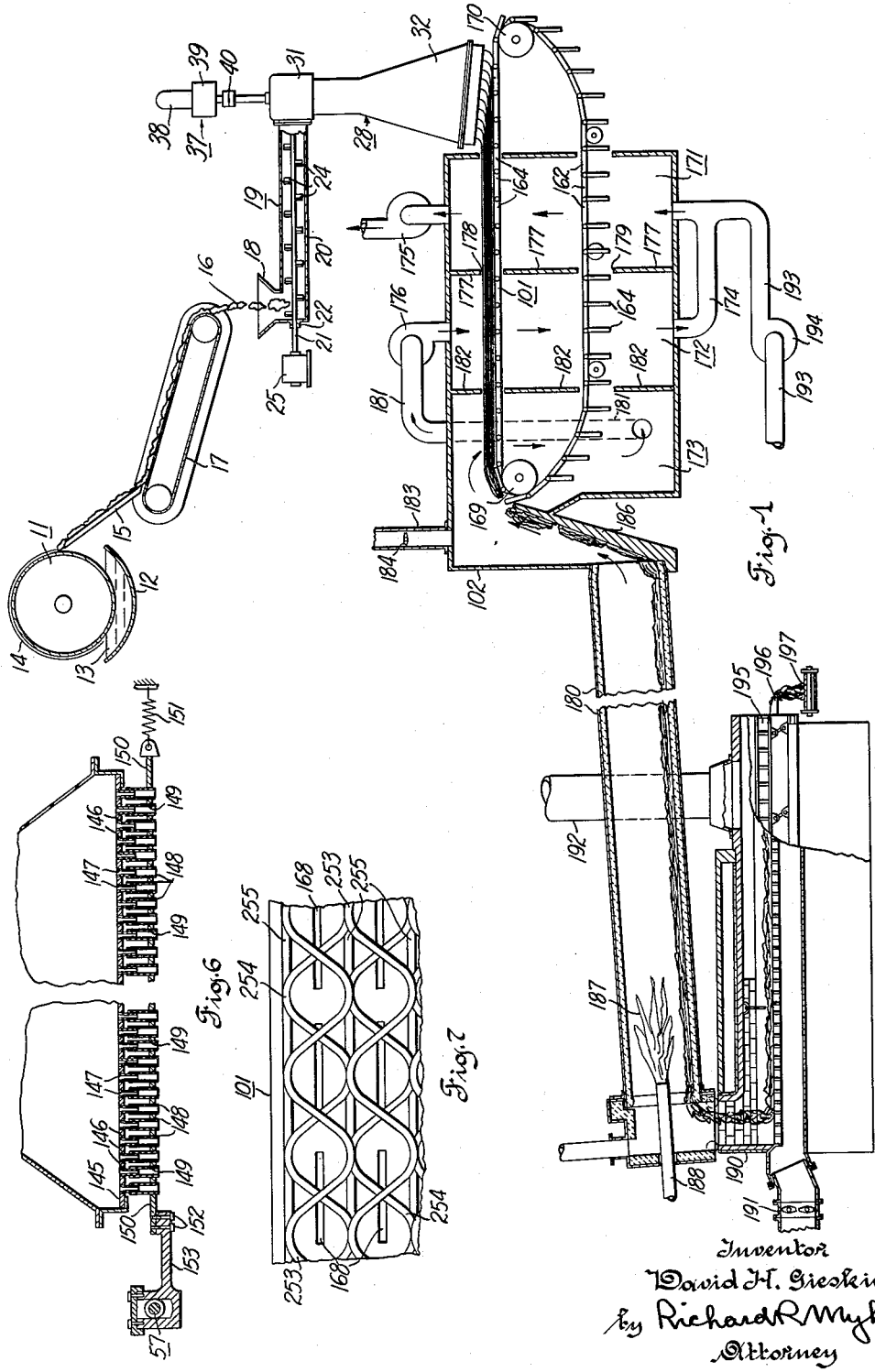
Inventor
David H. Gieskieng
By Richard R. Mybeck
Attorney

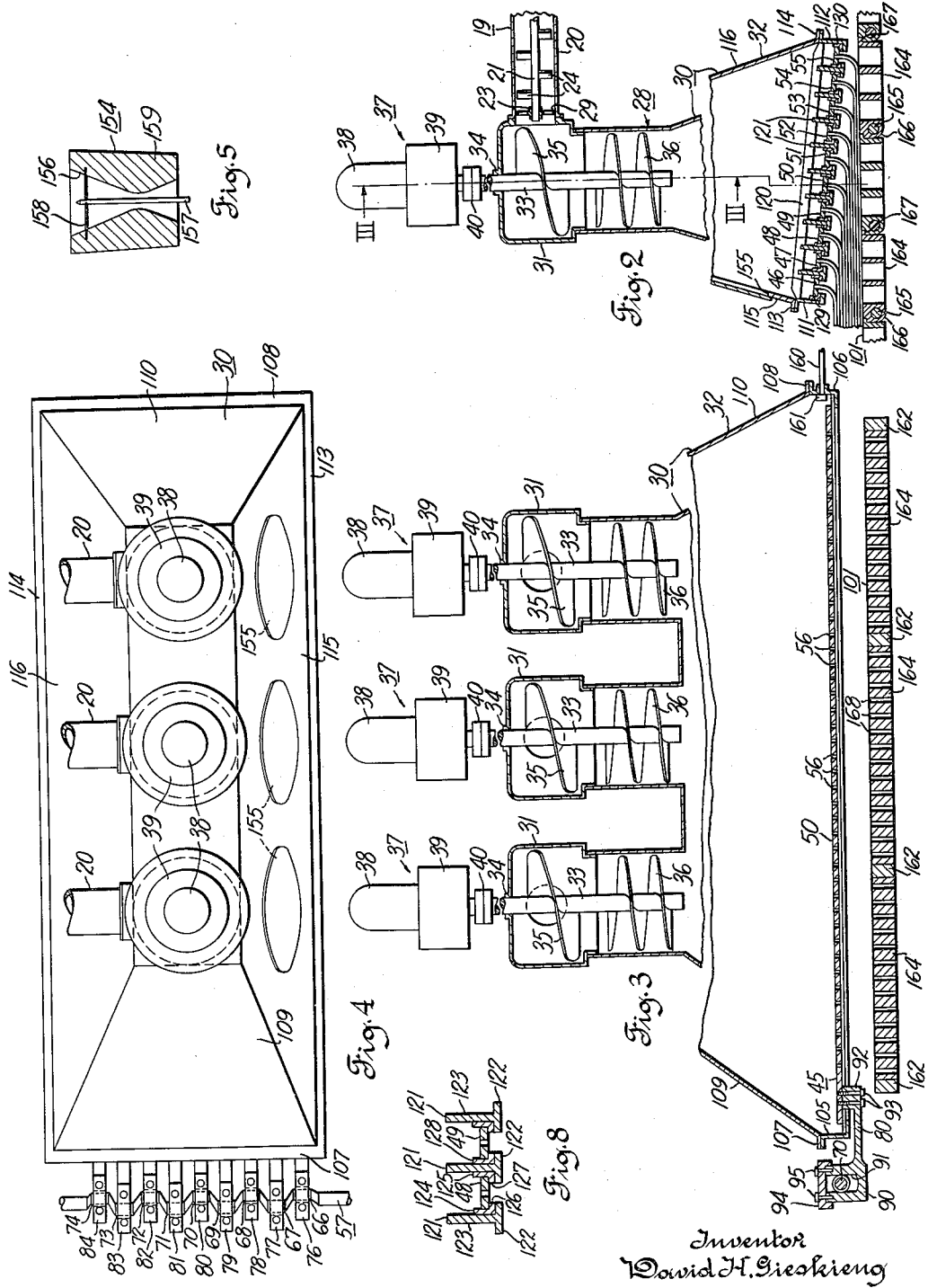

2,993,687
WET PROCESS FOR MAKING CEMENT AND APPARATUS FOR USE THEREWITH

David H. Gieskieng, West Allis, Wis., assignor to Allis-Chalmers Manufacturing Company, Milwaukee, Wis.
Filed Apr. 28, 1958, Ser. No. 731,275
17 Claims. (Cl. 263—32)

The present invention relates generally to the manufacture of cement and more particularly to apparatus and processes for manufacturing cement according to so-called wet process principles.

Cement has for many years been produced by burning a proper mixture of materials in a kiln. These mixtures heretofore have been prepared either wet or dry, thus the nomenclature.

As compared with dry cement manufacturing processes, the wet processes have the advantages that a more homogeneous and, hence, satisfactory mixture of the raw materials can be made and a more constant composition can be maintained. Moreover, grinding of wet material requires less power, and the output of the mills is greater than with a dry process. In addition, there is less dust connected with the wet process than with the dry process.

A disadvantage of the wet process exists in the realm of fuel economy. Because of the water content of the slurry, additional heat is required to evaporate this water before the materials can be burned. Additional heat means more fuel is needed to operate the process. More fuel means more cost.

A variety of proposals have been made to improve the fuel economy of the wet process systems. One of the more successful of these proposals involved the passage of the wet process slurry through filters to remove the excess water and provide a filter cake containing the desired ingredients. The filter cake is then fed to a kiln and burned with a fuel consumption on the order of 1,100,000 B.t.u. per barrel.

Progress among dry process systems also continued and the passage of time brought to this industry the development of new processes and equipment for making dry process cement even more economically. One of the more significant of the developments for effecting fuel economy in the so-called dry process system is the development of the combination grate-kiln system. The grate-kiln system for preheating, preburning and finally burning dry cement materials was developed over a period of years and is disclosed in a series of United States patents to Dr. O. G. Lellep 1,775,313; 1,992,704; 1,994,718; and 2,466,601. This development reduced the heat requirements for making dry cement from approximately 1,100,000 B.t.u./bbl. to approximately 650,000 B.t.u./bbl., and it also eliminated most of the dust that had formerly resulted from making cement by the dry processes.

In the Lellep system, the dry ground raw material is combined with approximately 14% moisture, usually in the form of drops of water, in a pelletizing drum or pan where it is formed into small pellets approximately the size of marbles. These balls or pellets are then placed on a traveling grate and the hot gases from the kiln are drawn through the pellets to achieve an intimate and effective heat transfer with the pellets as well as considerable recouping of the kiln dust. Thus as the kiln exhaust gases, which carry a number of small cement particles with them, contact the moist balls of cement raw material traveling on the grate in the preheater, the fine particles of cement dust in the exhaust gases adhere to the surfaces of the pellets and are returned to the kiln. The fuel requirements of the grate-kiln system shown in U.S. Patent 2,466,601 are far less than the fuel requirements of the wet process system hereinbefore described, i.e., about 650,000 B.t.u./bbl.

The aforementioned nonuniformity of mixture which characterizes the dry cement processes, while greatly reduced, was not completely overcome in the original Lellep development and further efforts to develop a wet process which realized enhanced fuel economies continued. One approach indicated the possible utilization of a grate-kiln type of apparatus to achieve for the wet processes the fuel economies which had been realized for the dry processes. These efforts, however, have been largely limited to attempts to further the filtering action of conventional filter presses through the utilization of a vacuum and/or compression rolls and beaters as disclosed by Dr. Lellep's Patent No. 2,580,235. Through the use of the compression or compacting apparatus, the filter cake is brought to a point where it is frangible and nonplastic. When it has reached this condition, it is placed on the grate to provide a permeable bed. This bed may be effected by forming a random layer of the frangible filter cake which is broken into small aggregates of any shape, such as slugs, pills, briquets, etc., by using a pug mill, press or other suitable apparatus. The control of the moisture concentration in the filter cake to assure that the cake be in a nonplastic and breakable condition before being placed on the grate and the formation of permeable bed on the grate have presented considerable difficulties. Thus if the filter cake has too high a moisture content, it will retain its plastic state and cannot be satisfactorily broken. When this happens, a nonpermeable bed is formed on the grate.

When a nonpermeable or "blinded" bed is formed, the flow of gases through the bed is prevented creating a positive pressure in the system extending back to the kiln firing hood and preventing complete combustion of the burner fuel. The gases then become a carrier for non-combustibles which can cause secondary combustion of explosive force in later stages of the system. Additionally, the pressure causes puffing and allows the gases to escape to contaminate the atmosphere. Correction of the condition normally requires a slowdown of the system with a serious curtailment of production and, if secondary combustion occurs, a complete shutdown to replace damaged components of the system.

In the manufacture of wet process cement, the present invention overcomes many problems which have confronted the aforementioned systems. In the present invention a slurry of material is filtered only until it reaches a plastic puttylike consistency and is then extruded to form spaghetti or macaronilike elongated strands. These strands are then laid in a controlled pattern upon a traveling grate to form an open network pattern which provides optimum bed permeability. A suitable open network pattern may be one in which the strands cross or perhaps recross each other to form a lattice.

The approach of the present system differs from past systems in that extrusions are made while the filter cake is in a moist plastic condition. The plastic nature of the filter cake greatly enhances both the economies of extruder power and reduces abrasive wear. The necessity of flappers or compression rolls or filters is eliminated through the utilization of the present invention. Also the filter cakes in many instances need not be dewatered to the extent now required for conventional kiln operation which will improve the filter operation and make this phase even more acceptable to the user.

Accordingly, one of the prime objects of the present invention is the provision of a process for making cement which provides all of the aforementioned fuel economies heretofore realized and substantially limited to dry cement processes, while at the same time effecting the homogeneity of mixture and the ease of handling heretofore characteristic of the wet process cement.

Another object of the present invention is to provide an improved process for making cement in which a plastic workable filter cake containing homogeneous mixture of cement ingredients is extruded into macaroni or spaghetti-like elongated strands.

Another object of the present invention is to provide an improved process for making cement in which the cement ingredients are laid down upon a traveling grate in the form of a plurality of elongated strands defining a pattern which permits optimum permeability of the bed and provides maximum surface exposure of the cement ingredients to the hot gases.

Another object of the present invention is to provide an improved wet process for making a uniform cement product which is economically competitive in cost and superior in properties to those cement products produced by dry cement processes.

Another important object of the present invention is the provision of apparatus for producing wet process cement in which kiln exhaust gases are passed through a traveling grate to successively preheat portions of extruded strands of plastic cement material laid thereupon in an open permeable pattern.

Another important object of the present invention is the provision of apparatus for extruding plastic cement filter cake into macaroni-like or spaghetti-like strands.

These and still further objects as shall appear are fulfilled by the present invention in a manner readily apparent from the following detailed description when read in conjunction with the accompanying drawing in which:

FIG. 1 is a schematic showing of one embodiment of the process of the present invention and the apparatus associated therewith;

FIG. 2 is a side elevation in section of an extruder-grate arrangement embodying features of the present invention;

FIG. 3 is a sectional elevation taken along line III—III of FIG. 2;

FIG. 4 is a plan view of the apparatus of FIG. 3;

FIG. 5 is an enlarged sectional view of alternative feed means embodying the present invention;

FIG. 6 is an enlarged breakaway view, partially in section, of a further modification of the present invention;

FIG. 7 is a plan view of one pattern which may be disposed upon a moving grate utilizing the concepts and apparatus of the present invention; and FIG. 8 is an enlarged fragmentary showing of masking plate support means of FIG. 2.

Referring to the drawing, an exemplary embodiment of the present invention is shown comprising a drum-like vacuum filter 11 supported for rotation adjacent a tank or vessel 12 disposed therebeneath for receiving and containing a fluid slurry 13 having raw cement materials dispersed therethrough. Drum 11 may be rotated in any convenient manner. The vacuum in the filter may be regulated by any well known means to provide the desired moisture content in the filter cake 14 formed thereupon. For the present invention, it is found that filter cake having a moisture content between about 20 to about 30% is sufficiently moist to render the filter cake in the desired plastic pliable condition.

Referring to FIG. 1, the solid materials from the fluid slurry 13 are drawn against the outer periphery of the drum-like vacuum filter 11 and form a filter cake 14 thereupon which, as the filter 11 rotates, is scraped therefrom by a scraper or roll cleaner 15 to form fragmentary pieces 16. The pieces 16 then slide down the roll cleaner 15 onto a moving conveyer belt assembly 17, which in turn drops the pieces into a hopper 18 mounted upon homogenizer 19.

The hopper 18 which may be nothing more than a simple converging gravity feed if desired, delivers the material to the homogenizer 19 which works the pieces into a homogeneous plastic mass. A suitable homogenizer, as shown in FIGS 1 and 2, comprises a housing 20 in which a shaft 21 is rotatably mounted in suitable bearings 22, 23 and has a plurality of radially extending paddles 24 mounted thereon in offset staggered relationship to each other. A suitable power source such, for example, as motor 25 is operably linked with shaft 21 for driving paddles 24 through the plastic cement material to beat and mix the material into a homogeneous mass. Each of the paddles 24 is provided with a slightly inclined surface relative to shaft 21 to drive the plastic mass toward an extruder 28 in a manner similar to the action of a conventional screw conveyer. A foraminous bearing support 29 is provided bearing 23 to permit the substantially free flow of plastic mass of material from the homogenizer 19 to the extruder 28.

One extruder 28 of the present invention is shown in FIGS. 2, 3 and 4 and comprises a housing 30 having an upper portion 31 into which the plastic mass is discharged from homogenizer 19, and a lower or bin portion 32 into which the plastic mass is ultimately passed for extrusion as will be described.

A vertically disposed shaft 33 depends through a suitable bearing 34 into upper housing portion 31 and is provided, see FIGURE 2, with two adjacent screw conveyer blades 35, 36 to form a screw pump. In the embodiment of the invention shown, the upper blade 35 is provided with a radial dimension relative to shaft 33 which is relatively larger than the corresponding dimension of lower blade 36. Thus, the plastic mass received from the homogenizer 19 is engaged by blade 35 which promptly forces it downwardly (relative to the drawing) into engagement with blade 36 as it rotates in response to the rotation of shaft 33 by a suitable power means 37. As shown, power means 37 may comprise a motor 38 operably linked to shaft 33 through a gear reducer 39 and solid coupling 40.

The homogenized plastic mass continues its downward (relative to the drawing) movement by the coaction of blades 35, 36, and is forced into bin portion 32. Additional material is fed into the bin portion 32 until it becomes substantially full whereupon the continued rotation of shaft 33 and screw blades 35, 36 builds up a pressure in bin portion 32 which is utilized to effect a controlled extrusion of the plastic material into elongated spaghetti and/or macaronilike strands through a masking plate 45 which will now be described.

As shown in FIGS. 2 and 3, one embodiment of masking plate 45 comprises a plurality of discrete transversely extending elements 46–55, inclusive. Each of the elements has a plurality of die holes 56 uniformly spaced axially thereupon. Each of the elements 46–54 inclusive is independently connected to a suitable crankshaft 57 (see FIG. 4) so that when crankshaft 57 is rotated in response to a conventional driving means (not shown), the respective elements 46–54 are oscillated laterally.

More specifically, crankshaft 57 comprises a plurality of alternatingly offset crankpins 66–74 to which respectively are linked connecting rods 76–84 extending from the respective elements 46–54. Thus, as shown in FIG. 3 with respect to element 50, quite satisfactory results are obtained with a linkage comprising a connecting rod 80 having a U-shaped bracket portion 90 at one end thereof defining a channel 91 for receiving its corresponding crankpin 70 and having an upwardly extending block portion 92 detachably secured to transverse plate element 50 by a suitable means such for example as bolts 93. Crankshaft 57, and more specifically crankpin 70, is restrained within channel 91 by a cover plate 94 detachably secured to the ends of the U-shaped bracket portion 90 in any suitable manner such as with bolts 95. Cover plate 94 thus closes channel 91 defined in bracket portion 90 to provide lost motion means with respect to all of the vertical components of the movement of crankpin 70 while providing following means with respect to all of the horizontal components of the movement of crankpin 70. In this way, the rotary movement of crankshaft 57 is readily converted to rectilinear movement which is transmitted through connecting rod 80 to laterally oscillate the element 50 of the masking plate 45. A similar connecting rod-crankpin assembly is utilized with respect to each of the oscillating elements, adjacent ones of which, for example elements 48 and 49 or elements 49 and 50, oscillate at 180° out of phase with each other because of the previously described offset between adjacent crankpins, for example, pins 68 and 69 or pins 69 and 70.

The plastic mass forced downwardly upon masking plate 45 is, as stated, forced through the several holes 56 defined axially along each of the several transverse plate elements 46-55. The passage of the material through die holes 56 develops an elongated strand of material which may be woven by the oscillations of the elements 46-54, as described, into a permeable pattern upon moving grate 101. Depending upon the rate at which grate 101 traverses through a substantially enclosed pretreatment chamber 102, to be hereinafter described, a generally sinuous pattern of strands can be formed thereupon to provide optimum permeability to the material.

In the illustrated embodiment, the rearmost element, i.e., element 55, is maintained stationary while the remaining elements 46 through 54 are oscillated in the manner described.

Masking plate 45 may be mounted beneath bin portion 32 in any suitable manner, such as with Z-shaped brackets 105, 106 respectively secured as by welding to flanges 107, 108 which are respectively defined on the lower edges of the side walls 109, 110 of bin portion 32 (as shown in FIG. 3), and with Z-shaped brackets 111, 112 respectively secured as by welding to flanges 113, 114 which are respectively defined on the lower edges of end walls 115, 116 of bin portion 32 (as shown in FIG. 2).

In the embodiment utilizing the plurality of transversely extending elements herein described, the respective elements are slidably suspended from a retaining plate 120 preferably mounted transversely of bin portion 32 so that its smallest dimension opposes the downward flow of the plastic material and the interference of plate 120 with the flow of material is maintained at a minimum.

A plurality of support members 121 independently depend from the plate 120 intermediate each pair of the several elements and each has a flange portion 122 extending outwardly in both directions from a shank portion 123. A pair of facing angle members, for example members 124, 125 shown in FIG. 8 with respect to element 48, slideably carry the element interposed therebetween on inwardly (relative to their associated element) extending arm portions 126, 127 respectively. As shown in FIG. 8, one angle member from a track of one element, for example angle member 125 associated with transverse plate element 48, and a second angle member from the adjacent edge of the track of an adjacent element, for example angle member 128 associated with transverse plate element 49, are supported by the flange portion 122 of the support member 121 interposed therebetween. A similar support arrangement is utilized intermediate the remaining slideable elements although track angles 129, adjacent element 46, and track angle 130, adjacent element 55 are supported by their adjacent Z brackets 111, 112, respectively.

Thus the transverse plate elements by virtue of their overlapping relationship with their respective tracks are permitted free lateral movement in response to the movement of their respective connecting rods when actuated by the crankshaft 57.

As can be seen from FIGS. 2 and 3, the material shaping masking plate 45 is disposed in operative opposed relationship with traveling grate 101 so that the plastic material as it is forced through the masking plate is deposited upon the grate in the desired manner.

If it is not desired that the track assemblies be easily replaced as wear occurs, the track angles may be eliminated and the several plate elements permitted to ride directly upon the head flanges 122 of the several support members 121 depending intermediate of the elements 46-55 from the plate 120.

An alternative arrangement for effecting the oscillation of the various elongated strands of the plastic material relative to the traveling grate 101 is shown in FIG. 6. In this embodiment, a unitary masking plate 145 is provided with a plurality of die holes 146 positioned substantially uniformly longitudinally and transversely thereof. Each of the holes 146 is provided with a converging tubular member 147 which depends downwardly therefrom in teatlike relationship thereto and has fastened thereupon a flexible elastomeric tube 148. The flexible tubes 148, of each transversely extending line of holes, protrude through a series of corresponding openings 149 defined in register therewith in their associated extending arm member 150. Additional arm members are provided so that each transversely extending line of die holes has one arm member operably associated therewith. The extending arm members, for example, arm member 150, are secured at one side of the apparatus and spring biased thereto with a suitable resilient connection 151. The other end of the arm 150 is suitably secured, as with bolts 152, to connecting rod 153 which is secured to crankshaft 57 in a suitable manner such for example as that explained in connection with the earlier embodiment. Thus, the rotary movement of the crankshaft is again converted to rectilinear movement of the several arm members. In this arrangement, masking plate 145 may be an integral sheet and the wobble or weave of the strands of plastic material disposed upon the grate 101 effected by the lateral oscillation of the flexible tubes 148 through the action of the lever arm 150 in response to the crankshaft 57.

A further modification of the present invention is shown in FIG. 5 and comprises a plug member 154 insertable into the die holes 56 of masking plate 45. Plug 154 comprises a tapered annular shell 159 preferably having a converging inner surface 156. A thin elongated pin 157 is suspended centrally through plug member 154 by a plurality of wire support strands 158 interposed between inner surface 156 and pin 157. Thus, if it is desired to provide a strand having a hollow center similar to macaroni, it can be readily effected by extruding the material through an opening of the type defined by the plug shown in FIG. 5. The converging inner surface coacts to assure completeness of the extruded tube although when the extruder pressure is sufficiently high, quite satisfactory tubes may be extruded by merely depending a wire mounted pin through the die holes without using a plug of the type described. The other openings hereinbefore described, all of which are of a nonobstructed character, will provide a substantially solid cylindrical plastic strand (very similar to spaghetti) for deposit upon the traveling grate.

One pattern of continuous strands which has been found to give satisfactory results in the practice of the present invention is shown in FIG. 7 and is effected by laying down straight strands 255 and then oscillating the other strands 253, 254 defined by the alternative strand forming assemblies herein described. Thus when the rear element 55 (or the corresponding row of tubes 148) is maintained stationary relative to the oscillating elements 46-54 (or their corresponding row of tubes), it will lay down substantially parallel longitudinally extending strands upon the traveling grate 101.

After a run, it is desirable to clean the plastic mass out of the extruder and the several holes in the masking plate. I find that the extruder is readily cleaned by running the extruder until all of the material in the upper portion 31 is driven into the bin portion 32, and then removing the material from the bin portion 32 through suitable manholes 155, conveniently disposed in the side walls and the end walls of the bin portion. Or the material may be flushed out with a fire hose or other suitable water supply means.

The cleanout of the several die holes in the masking plate is effected by providing each transversely extending line of die holes with an extensible conduit 160 (see FIG. 3) having a nozzle member 161 attached thereto for directing an air or water jet flow downwardly through the holes. Other linkage arrangements may be provided so that a given nozzle may deliver a directed flow of cleaning fluid to more than one row of holes although the principle of blasting with fluid the plastic mass from within the holes to clean the holes remains the same.

One grate 101 found suitable for use in the present invention comprises spaced substantially parallel endless link belts 162 having a plurality of transversely extending plates 164 pivotally connected thereto as with pins 165 and extending therebetween. In the grate shown, the leading edge 166 of the several plates is pivotally connected to belts 162 while the trailing edge 167 rides upon the leading edge 166 of the plate immediately adjacent thereto. In this manner, the plates are provided with a throwover as they complete their upper pass to provide a self-cleaning action to the grate while the plates depend downwardly from belts 162 during the lower pass. As the belt carried hinged plates approach the upper run, the plates are returned to their horizontal overlapping relationship and provide a bearing surface upon which the extruded plastic strands are deposited. Each of the plates 164 is provided with a plurality of longitudinally extending slits 168 to enable the passage of gases therethrough. Motive power is effected for grate 101 by means of a suitable power source (not shown) driving at least one of the rollers 169, 170, about which the grate is reeved.

The plastic material strands deposited upon the traveling grate 101 are fed into a pretreatment chamber 102 which shall now be described.

Pretreatment chamber 102 comprises three vertical zones 171, 172, 173 through which the continuous plastic strands are successively passed for engagement with a controlled countercurrent flow of the exhaust gases coming from an associated kiln 180.

The material deposited upon grate 101 by the extruder 28 is immediately carried into a first zone 171 of the pretreatment chamber 102 where it is engaged by upwardly flowing stream of moderately warm (about 250° to 400° F.) kiln exhaust gas passing between a suitable conduit 174 and exhaust fan 175. The material, see the arrows in FIG. 1, first encounters the exhaust gas with its lowermost strands. These lower strands thus have some moisture removed therefrom to provide sufficient strength thereto and these strands then support the weight of the strands superposed thereupon. In this manner, substantially no slump occurs in the stack of strands.

The continuously moving grate 101 then passes the strands from the first pretreatment zone 171 into a second pretreatment zone 172 where the strands are engaged by a downwardly flowing stream of relatively warmer gases (about 500° to 900° F.) passing between blower fan 176 and conduit 174. First zone 171 and second zone 172 may be segregated from each other by a baffle plate 177 having passageways 178, 179 defined therein to permit the passage of the upper and lower runs of the grate respectively therethrough, although if desired conduit 174 may be effectively relocated immediately beneath the upper run of the grate to reduce the distance the gases must travel before entering the first pretreatment zone or if desired plate 177 may be eliminated and the gas flow left to the influence of blower fan 176 and exhaust fan 175. A still further modification may include the insertion of another blower fan in conduit 174 to accelerate the flow of the gases therethrough. The particular choice of flow guides however will be determined by operational characteristics and is within the knowledge of the designer. The warmer gases of the second zone further preheat and dry the plastic strands preparing them for introduction into a third pretreatment zone 173.

The continuously moving grate 101 next carries the strands of partially preheated material from the second pretreatment zone 172 into a third pretreatment zone 173 where the strands are engaged by a downwardly flowing stream of hot exhaust gases (about 1700° to 1850° F.) passing from kiln 180 across the material, into conduit 181 and hence to blower fan 176. These hot gases complete the pretreatment of the dried strands by raising the temperature of the strands up to approximately 1800° F. in preparation for their introduction into kiln. A baffle plate 182, similar to plate 177, may be interposed between the second and third pretreatment zones to provide substantial segregation therebetween when desired.

Adjacent third pretreatment zone 173, an exhaust vent 183 is provided having a damper 184 contained therein which is controllable, either manually or by automation, to bleed off exhaust kiln gases when draft is desired as when starting the kiln, to bleed off gases when positive pressure arises during operation and to enable quick venting during emergency shutdowns to prevent overheating the grate. The gases thus bled off may be recycled back through the pretreatment chamber, led through a water filter, or otherwise dissipated in accordance with the operator's desires.

Some of the kiln dust carried in the exhaust gas adheres to the moist strand surfaces in the second zone 172 and the remainder of dust is substantially removed in the first zone 171. Thus, by the time the gases are exhausted through fan 175 connected with the first zone, substantially no kiln dust remains so that the cleanliness of the environs of my apparatus is greatly enhanced.

The passage of the material through the pretreatment chamber 102 in the manner described brings the material up to a temperature so that the temperature gradient across the kiln 180 is kept to a substantially irreducible minimum and the thermal efficiency of the total operation is exceedingly high.

As previously indicated, a desirable pattern for laying the strands upon the grate is shown in FIG. 7 although it is anticipated that other permeable patterns may occur to those skilled in the art which may be readily effected by only slight modification of the positions of the various crankpins relative to each other. Similarly, the strands may be either continuous or intermittent extruded sections, depending upon the exigencies of a particular operation.

The pretreated material, having passed through the pretreatment chamber 102, is dumped from the grate 101 down a chute 186 and enters a kiln 180. In the kiln, the material may be tumbled or otherwise transported through the kiln while it is burned by a flame 187 resulting from the ignition of fuel entering through a fuel inlet 188. The present invention is not limited to any specific kiln and any commercial furnace adaptable to the process of this invention may be used with satisfactory results.

The burned cement is dropped from kiln 180 into a cooler 190 in which a flow of coolant, controlled by suitable means such for example as pulsating damper 191, removes the remaining heat from the cement. The coolant, after cooling the cement, passes out an exhaust stack 192 at an average temperature of about 350° F. The cooler exhaust may, if maximum heat efficiency is to be realized, be directed into the pretreatment chamber 102 through a conduit 193 which, if it is desired to increase the velocity of the gas, may include a fan 194. Because of the temperatures involved, it is believed that maximum effectiveness of the cooler exhaust gas will be realized by directing its flow into first pretreatment zone 171. The burned cement material is transported through the cooler by any suitable means such, for example, as conveyer 195, and is discharged therefrom out of discharge spout 196 onto a conveyer 197 for movement to grinding and final storage processes. It is likewise understood that the present invention is not limited to any specific cooler and any of the well known clinker coolers currently in commercial use may be used in the present invention with satisfactory results.

To summarize the operation of the present invention: a suitable mixture of the desired cement raw materials is made into a slurry form and fed into tank 12 from which, through the action of vacuum drum filter 11, the material is sucked up onto the outer periphery of the drum to form a plastic filter cake 14 having a moisture content of from about 20 to about 30%. As the drum rotates, a drum roll cleaner 15 scrapes the filter cake 14 therefrom as pieces 16 which slide down the cleaner 15 onto a rotatably mounted power driven conveyer assembly 17. From the conveyer assembly 17, the material is fed into the hopper 18 of the homogenizer 19, where through the action of driven shaft 20 and the inclined paddles 24, it is blended into a homogenized plastic mass and forced into extruder 28. In the extruder 28, the homogeneous plastic mass of material is forced down into bin portion 32 and extruded through a die plate portion like masking plate 45 as elongated plastic strands which define a suitably permeable pattern upon traveling grate 101 to permit the passage of gases therethrough in a pretreatment chamber 102.

The material disposed upon the grate is then carried through the pretreatment chamber into sequential engagement with upflowing and then downflowing kiln exhaust gases passing countercurrently to the material.

The pretreated strands are then discharged from grate 101 and enter kiln 180 where they are burned. The burned cement material, after passing through the kiln, is passed through a cooler 190 and out discharge spout 196 onto a conveyer 197 where it is directed to grinder and thence to a packaging station.

The term "elongated strands" as used herein includes extruded lengths of material which may be provided in either continuous or relatively shorter lengths although continuous lengths provide maximum capacity for the invention and may be either tubular (like macaroni), cylindrical (like spaghetti), or flat (like noodles) in cross section although the tubular and cylindrical are preferred because they provide maximum surface exposure for the optimum capacity of the apparatus of the invention. Such other cross sectional configurations as may readily occur to one skilled in the art, e.g., star shape and the like, which may be effected by extruding the pliable plastic material through appropriate die holes, are intended also within the scope of this invention.

In addition, the process herein described may be further modified to permit the formation of some cement clinker in the third pretreatment zone provided care is exercised not to allow the temperature to exceed the melting temperature of the grate material.

It is of course further understood that the exemplary embodiments and modifications of the present invention which are herein described and illustrated are not intended in any way to limit but rather are presented to explain the present invention. Accordingly, such other modifications or alterations as may readily occur to one skilled in the art are intended within the spirit of the present invention especially as it is defined by the appended claims.

What is claimed is:

1. Apparatus for making wet process cement and the like comprising: a pretreatment chamber; a gas permeable conveyer within said chamber; a furnace arranged to receive pretreated material from said conveyer and to discharge exhaust gases into said chamber; material supply means for delivering material in a plastic condition to said pretreatment chamber; and extruding means connected to said supply means and having a bin portion, a force transmitting portion, and a masking plate portion, said bin portion receiving said material from said supply means and containing said material adjacent said masking plate portion, said force transmitting portion being operable to extrude said plastic material from said bin portion through said masking plate portion according to a preselected pattern to deposit, onto said conveyer a permeable pattern of said material in the form of elongated strands for transfer by said conveyer through said chamber to said furnace.

2. Apparatus for making wet process cement and the like comprising: a pretreatment chamber; a gas permeable conveyer within said chamber; a furnace arranged to receive pretreated material from said conveyer and to discharge exhaust gases into said chamber; extruding means; and material supply means for delivering material in a homogenized plastic condition to said extruding means, said extruding means having a bin portion, a force transmitting portion and a masking plate portion, said bin portion receiving said homogenized plastic material from said material supply means and containing said material adjacent said masking plate portion, said force transmitting portion being operable to extrude said homogenized plastic material from said bin portion through said masking plate portion according to a preselected pattern to deposit onto said conveyer a gas permeable pattern of said material in the form of elongated strands for transfer by said conveyer through said chamber to said furnace.

3. Apparatus for making wet process cement and the like comprising: a pretreatment chamber; a gas permeable conveyer within said chamber; a furnace arranged to receive material from said conveyer and discharge exhaust gases into said chamber; and material supply means operable to deliver material in a plastic condition to said chamber upon said conveyer in the form of a gas permeable pattern of continuous elongated strands for transfer by said conveyer through said chamber to said furnace.

4. Apparatus for making wet process cement and the like comprising: a pretreatment chamber; a gas permeable conveyer within said chamber; a furnace arranged to receive material from said conveyer and discharge exhaust gases into said chamber; material supply means for delivering material in a plastic condition to said chamber upon said conveyer in the form of continuous elongated strands for transfer by said conveyer through said chamber to said furnace, said material supply means including extruding means having die means operatively associated therewith, said extruding means being operable to forcibly discharge said plastic material through said die means according to a preselected pattern to deposit a permeable pattern of said strands upon said conveyer.

5. A process for treating raw material in the manufacture of wet process cement and the like comprising: forming raw material into a homogeneous plastic mass; forming said homogeneous plastic mass into elongated strands; forming said elongated strands into a gas permeable movable body with individual strands at rest within said body; establishing a gas confining preheating zone and a gas confining burning zone; conveying said body of strands of said material through said preheating zone; discharging said material from said preheating zone into said burning zone; tumbling said material through said burning zone; and effecting a flow of heated gases countercurrent to the movement of said tumbling material in said burning zone and through said body of strands of said material in said preheating zone to dry and preheat said material in said preheating zone and to burn said tumbling material in said burning zone.

6. A process for treating raw material in the manufacture of wet process cement and the like comprising: forming raw material into elongated plastic strands, forming said strands into a movable body with individual strands at rest within said body; establishing a gas confining preheating zone and a gas confining burning zone;

conveying said body of strands of said material through said preheating zone; discharging said material from said preheating zone into said burning zone and tumbling said material through said burning zone; effecting a flow of heated gases countercurrent to the movement of said tumbling material in said burning zone to burn said tumbling material in said burning zone; and then passing said gases through said body of strands of said material in said preheating zone to dry and preheat said material in said preheating zone.

7. A process for treating raw material in the manufacture of wet process cement and the like comprising: forming raw material into continuous strands; forming said strands into a gas permeable movable body with individual strands at rest within said body; establishing a gas confining preheating zone and a gas confining burning zone; conveying said body of strands of said material through said preheating zone to preheat said material; discharging said preheated material into said burning zone; tumbling said material through said burning zone while effecting a flow of heated gases countercurrent to the movement of said tumbling material in said burning zone to burn said tumbling material in said burning zone; and effecting a flow of heated gases through said body of strands of said material in said preheating zone to dry and preheat said material in said preheating zone.

8. A process for treating raw material in the manufacture of wet process cement and the like comprising: mixing the raw materials into a homogeneous plastic mass; forming the homogeneous plastic mass into a plurality of elongated strands defining a movable gas permeable body having individual strands at rest therein; introducing said movable gas permeable body of material into a pretreatment chamber for drying and preheating engagement with heated gases; discharging said pretreated material from said pretreatment chamber into a furnace for burning engagement therein with hot gases; effecting a flow of hot gases through said furnace countercurrently of said pretreated material in heat transmitting relationship therewith; and then, while said gases are still heated, directing said gases into said pretreatment chamber in heat transmitting relationship with said body.

9. Apparatus for making wet process cement and the like comprising: a pretreatment chamber; a gas permeable conveyer within said chamber; a furnace arranged to receive pretreated material from said conveyor; means to provide heated gases into said chamber; extruding means; and material supply means for delivering material in a homogenized plastic condition to said extruding means, said extruding means including force transmitting means and strand forming means, and operable to receive said homogenized plastic material from said material supply means adjacent said strand forming means, said force transmitting means being operable to force said homogenized plastic material through said strand forming means onto said conveyer; means operatively associated with said strand forming means for oscillating the strands passing therethrough to define an open permeable pattern upon said conveyer for transfer thereby through said chamber to said furnace.

10. Apparatus for making wet process cement and the like comprising: a pretreatment chamber; a gas permeable conveyer within said chamber; a furnace arranged to receive pretreated material from said conveyer and to discharge exhaust gases into said chamber; material supply means for delivering material in a plastic condition to said pretreatment chamber; and extruding means connected to said supply means and having a bin portion, a force transmitting portion, and a foraminous die plate portion, said bin portion receiving said material from said supply means and containing said material adjacent said die plate portion, said force transmitting portion being operable to extrude said plastic material from said bin portion through said die plate portion according to a preselected pattern to deposit onto said conveyer a permeable pattern of said material in the form of elongated strands for transfer by said conveyer through said chamber to said furnace.

11. Apparatus for making wet process cement and the like comprising: a pretreatment chamber having a plurality of material treating zones; a gas permeable conveyer within said chamber for sequentially traversing said zones; a furnace arranged to receive pretreated material from said conveyer adjacent one of said zones and to discharge exhaust gases into said one of said zones of said chamber; material supply means for delivering material in a plastic condition to said pretreatment chamber; and extruding means connected to said supply means and having a bin portion, a force transmitting portion, and a die plate portion, said bin portion receiving said material from said supply means and containing said material adjacent said die plate portion, said force transmitting portion being operable to extrude said plastic material from said bin portion through said die plate portion according to a preselected pattern to deposit onto said conveyer a permeable pattern of said material in the form of elongated strands for transfer by said conveyer through said zones of said chamber to said furnace.

12. Apparatus for making wet process cement and the like comprising: a pretreatment chamber having at least a first and a last material zone; a gas permeable conveyer within said chamber operable while working for movement sequentially through said material treating zones; a furnace arranged to receive pretreated material from said conveyer and to discharge exhaust gases into said chamber countercurrently of said movement of said conveyer through said zones; material supply means for delivering material in a plastic condition to said pretreatment chamber; and extruding means connected to said supply means and having a bin portion, a force transmitting portion, and a die plate portion, said bin portion receiving said material from said supply means and containing said material adjacent said die plate portion, said force transmitting portion being operable to extrude said plastic material from said bin portion through said die plate portion to deposit onto said conveyer a permeable pattern of said material in the form of elongated strands for transfer by said conveyer through said chamber to said furnace.

13. Apparatus for making wet process cement and the like comprising: a pretreatment chamber having at least a first and a last material zone; a gas permeable conveyer within said chamber operable while working for movement sequentially through said material treating zones; a furnace arranged to receive pretreated material from said conveyer and to discharge exhaust gases into said chamber countercurrently of said movement of said conveyer through said zones; material supply means for delivering material in a plastic condition to said pretreatment chamber; and extruding means connected to said supply means and having a bin portion, a force transmitting portion, and a die plate portion, said bin portion receiving said material from said supply means and containing said material adjacent said die plate portion, said force transmitting portion being operable to extrude said plastic material from said bin portion vertically through said die plate portion to deposit onto said conveyer a permeable pattern of said material in the form of elongated strands for transfer by said conveyer through said chamber to said furnace.

14. Apparatus for making wet process cement and the like comprising: a pretreatment chamber; a gas permeable conveyer within said chamber; a furnace arranged to receive pretreated material from said conveyer and establish a flow of heated gases through said furnace and said chamber; material supply means for delivering material in a plastic condition to said pretreatment chamber; and extruding means connected to said supply means and having a bin portion, a force transmitting portion, and a die plate portion, said bin portion receiving said material from said supply means and containing said material adjacent said die plate portion, said force transmitting portion being operable to extrude said plastic material from said bin portion through said die plate portion according to a preselected pattern to deposit onto said conveyer a permeable pattern of said material in the form of elongated strands for transfer by said conveyer through said chamber to said furnace countercurrently of said flow of heated gases.

15. Apparatus for making wet process cement and the like comprising: a pretreatment chamber; a gas permeable conveyor within said chamber; a furnace arranged to receive pretreated material from said conveyer and to discharge exhaust gases into said chamber; material supply means for delivering material in a plastic condition to said pretreatment chamber; and means, including a die plate, connected to said supply means for receiving said material from said supply means and being operable to extrude said plastic material through said die plate according to a preselected pattern to deposit onto said conveyer a movable gas permeable body containing said material in the form of individual elongated strands at rest relative to each other within said body for transfer by said conveyer through said chamber to said furnace.

16. Apparatus for making wet process cement and the like comprising: a pretreatment chamber; a gas permeable conveyer within said chamber; a furnace arranged to receive pretreated material from said conveyer and to discharge exhaust gases into said chamber; material supply means for delivering material in a plastic condition to said pretreatment chamber; and means, including a die plate, connected to said supply means for receiving said material from said supply means and being operable to extrude said plastic material through said die plate according to a preselected pattern to deposit onto said conveyer a movable gas permeable body containing said material in the form of individual elongated tubular strands at rest relative to each other within said body for transfer by said conveyer through said chamber to said furnace.

17. Apparatus for making wet process cement and the like comprising: a pretreatment chamber; a gas permeable conveyer within said chamber; a furnace arranged to receive pretreated material from said conveyer and to discharge exhaust gases into said chamber; material supply means for delivering material in a plastic condition to said pretreatment chamber; and means, including a die plate, connected to said supply means for receiving said material from said supply means and being operable to extrude said plastic material through said die plate according to a preselected pattern to deposit onto said conveyer a movable gas permeable body containing said material in the form of individual elongated flat strands at rest relative to each other within said body for transfer by said conveyer through said chamber to said furnace.

References Cited in the file of this patent

UNITED STATES PATENTS

| | | |
|---|---|---|
| 2,054,156 | Finkeldey | Sept. 15, 1936 |
| 2,214,345 | Pike | Sept. 10, 1940 |
| 2,738,298 | David et al. | Mar. 13, 1956 |